United States Patent [19]

Simmons

[11] 3,924,905

[45] Dec. 9, 1975

[54] REMOVAL OF OBSTRUCTING SNOW FROM WITHIN SNOWMOBILE TRACK ENCLOSURES

[76] Inventor: Verlin M. Simmons, 495 S. Main, Providence, Utah 84332

[22] Filed: Oct. 21, 1974

[21] Appl. No.: 516,314

[52] U.S. Cl. .................................. 305/12; 180/5 R
[51] Int. Cl.² .......................................... B60S 1/62
[58] Field of Search .......... 180/5 R; 305/11, 12, 13, 305/35 R, 35 EB

[56] References Cited
UNITED STATES PATENTS

| | | | |
|---|---|---|---|
| 2,385,758 | 9/1945 | Hansen | 305/12 |
| 2,999,723 | 9/1961 | Ostberg | 305/12 |
| 3,236,568 | 2/1966 | Bombardier | 305/12 |
| 3,341,260 | 9/1967 | Skanes | 305/13 |
| 3,443,844 | 5/1969 | Schoonover | 305/13 |
| 3,598,454 | 8/1971 | Richards | 305/35 EB |
| 3,782,787 | 1/1974 | Rubel | 305/35 EB |

*Primary Examiner*—Philip Goodman
*Assistant Examiner*—John A. Carroll
*Attorney, Agent, or Firm*—Lynn G. Foster

[57] ABSTRACT

A snowmobile comprising a motor for powering the snowmobile, a vehicle upon which the user is carried, a steering mechanism, an endless belt track the path of which forms an enclosure with drive means contained within the enclosure and snow plow bars mounted to the inside surface of the belt track and carried along with the track during rotation to plow obstructing snow from within the snowmobile track enclosure.

6 Claims, 3 Drawing Figures

U.S. Patent  Dec. 9, 1975  3,924,905
FIG. 1
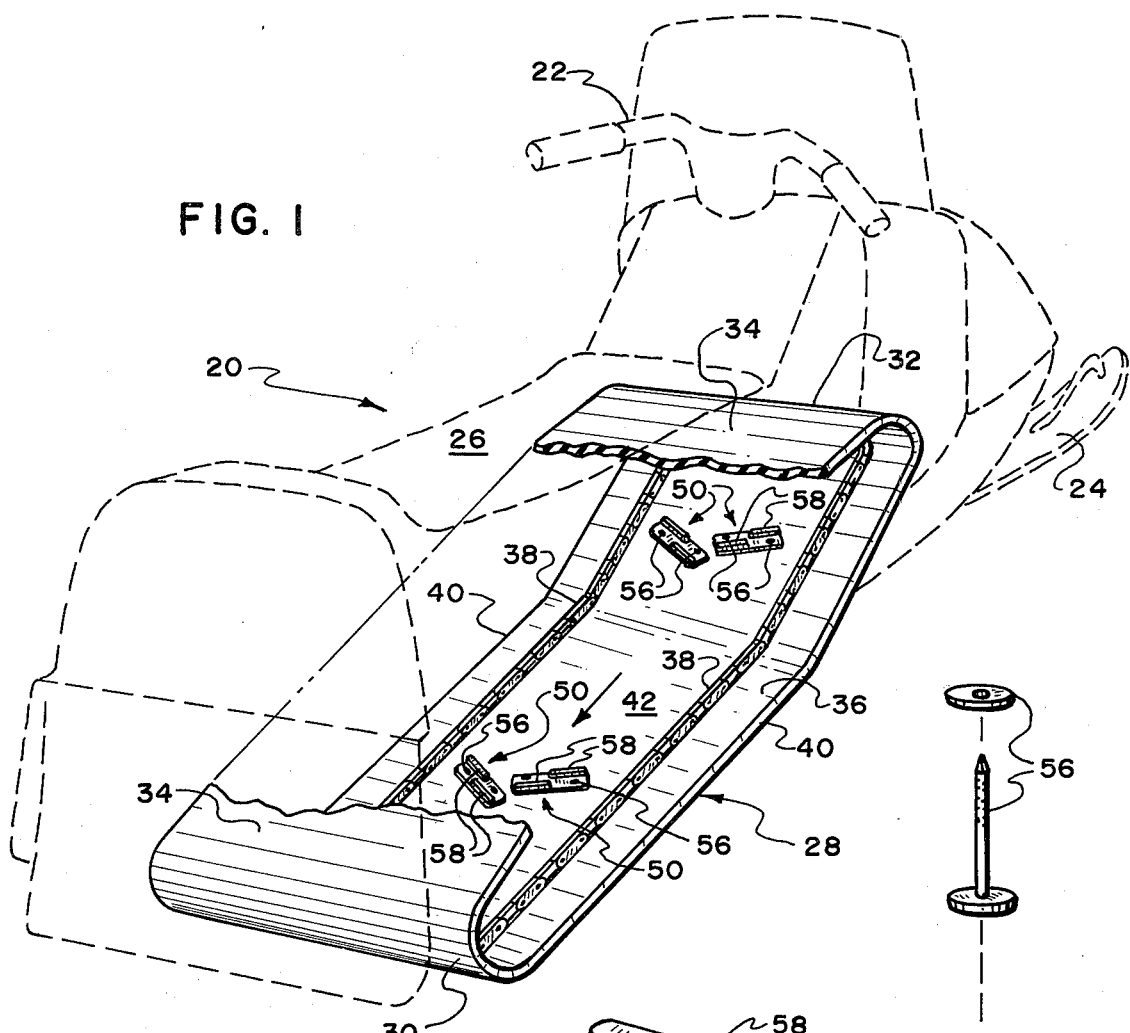
FIG. 2
FIG. 3
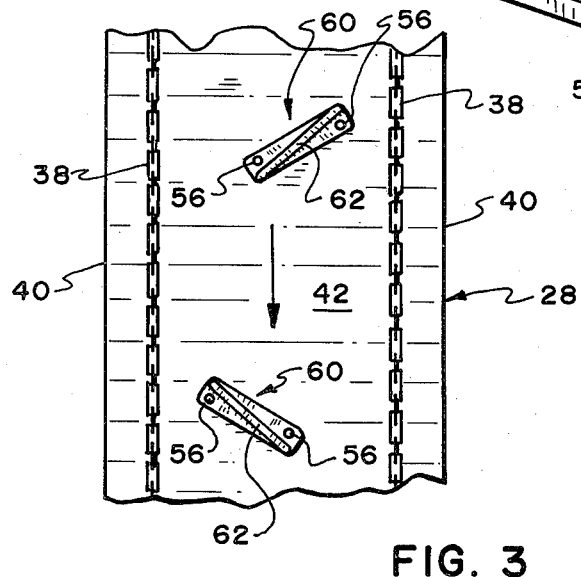

REMOVAL OF OBSTRUCTING SNOW FROM WITHIN SNOWMOBILE TRACK ENCLOSURES

BACKGROUND

Field of Invention

The present invention relates generally to snowmobiles and more particularly to snowmobiles comprising an endless belt track having novel snow plow means interiorly mounted thereon to alleviate the problem of snow obstruction within the track enclosure.

Prior Art

Traditionally, snowmobiles have been manufactured to include a vehicle upon which the user rides, a steering mechanism, a motor or prime mover, an endless belt track and drive components located within the enclosure of the endless belt track which is powered by the motor. Utilization of such snowmobile units has frequently resulted in an accumulation of snow within the belt track enclosure which, on occasions, clogged the drive components to the point of prohibiting or greatly restricting track rotation. To restore the snowmobile to the point where it may be once more properly utilized, manual removal of the obstructing snow has been required. To my knowledge, no instrumentation has been devised for removing such offending snow during operation of the snowmobile in such a fashion as to obviate total immobilization or undue impairment in the operation of the snowmobile.

BRIEF SUMMARY AND OBJECTS OF THE PRESENT INVENTION

The present invention comprises the placement of snow plow inserts upon the interior surface of a belt track of a snowmoble such that the inserts rotate free of interference with other parts of the snowmobile, engage snow as snow accumulates within the enclosure formed by the belt track and displaces the snow from the enclosure. The present invention also contemplates that said inserts comprise one or more protrusions which extend into said enclosure and are preferably diagonally disposed so as to engage and plow offending snow to one or the other or both edges of the belt track during belt rotation.

With the foregoing in mind, it is a primary object of the present invention to provide novel snow plow structure to be mounted to the inside surface of the belt track of a snowmobile for removal of obstructing snow from within the enclosure formed by the track during snowmobile operation.

A further paramount object of the present invention is to provide a snowmobile including a prime mover and an endless belt track wherein the belt track comprises novel snow plow structure disposed at the inside surface of the belt track whereby immobilization of the snowmobile due to snow interference within the track is overcome.

It is a further significant object of the present invention to provide an endless belt track for snowmobile utilization which comprises snow plow structure immovably united with the inside surface of the belt track which cleans snow from within the track during rotation.

These and other objects and features of the present invention will be apparent from the following detailed description, taken with reference to the accompanying drawings.

BRIEF DESCRIPTION OF THE DRAWINGS

In FIG. 1 a fragmentary perspective of a snowmobile, shown in dotted lines, and an endless belt track equipped with snow plow structure according to the present invention;

FIG. 2 is a perspective representation of one presently preferred snow plow structure according to the present invention; and FIG. 3 is a plan view of a second snow plow structure according to the present invention mounted to the inside surface of an endless snowmobile belt track.

DETAILED DESCRIPTION OF THE ILLUSTRATED EMBODIMENTS

Specific reference is now made to the drawings wherein like numerals are used to designate like parts throughout. FIG. 1 in particular illustrates in dotted lines a snowmobile generally designated 20 which comprises a frame to which a steering mechanism comprising handle bars 22 and dirigible skis 24 are mounted. The snowmobile 20 also comprises a seat 26 normally occupied when the snowmobile is being used. As is also conventional, the snowmobile 20 comprises a prime mover or motor and drive components around which an endless belt track 28 is displaced. Since the motor and drive mechanism may comprise essentially any well known prior art configurations, no detailed illustration or description thereof is believed necessary to an understanding of the present invention.

The endless belt track 28 extends around the drive mechanism and forms an enclosure between opposed ends 30 and 32 and between upper and lower legs 34 and 36 of the belt track 28. The belt track 28 is made of elastomeric material, such as nylon or neoprene, and may be suitably reinforced by wire, fabric cord or the like in a conventional manner. The track 28 is illustrated as being equipped with linkage or chain tracks 38 disposed, respectively, near the edges 40 of the belt track 28. These chain tracks are conventionally mounted to the interior surface of the belt track 28 and are engaged by the drive mechanism. Naturally, any other suitable arrangement may be utilized whereby the prime mover rotates the endless track 28 through engagement by the drive mechanism of the track.

Also mounted to the interior surface of the belt track 28 are a plurality of snow plow bars 50. Each snow plow bar 50 is illustrated as comprising a relatively thin base 52 having counterbore apertures 54 near the opposite ends thereof. A rivet 56 is placed through each aperture 54 and through aligned apertures (not shown) in the belt track 28 and secured so that the bars 50 are immovably mounted to the belt track 28 as illustrated in FIG. 1. In addition, each bar 50 comprises two spaced projections over protrusions 56 which are parallel one to the other and when each bar 50 has been disposed in contiguous relation with the inside surface 42 of the endless belt track 28. Thus, the protrusions 56 extend inwardly into the enclosure essentially transverse of the endless belt track 28 and extend diagonally from front to rear across a limited distance of the belt track 28. As can be observed from FIG. 1, the bars 50 comprise two sets which are oppositely diagonally disposed along said inside surface 42 so as to plow obstructing snow in opposite directions toward the two belt edges 40.

Thus, upon rotation of the belt track 28, the snowmobile 20 is displaced and snow accumulates within the enclosure formed by the endless belt track 28. As snow so accumulates, it will compact and accumulate within said enclosure. This accumulating effect is interrupted by periodic engagement by the bars 50 with offending snow rectilinearly plowing the same from within the enclosure toward the edges 40 of the belt track 28. In this fashion, it has been found that the accumulating snow does not ultimately immobilize or significantly restrict operation of the snowmobile which would otherwise occur, requiring manual removal of the offending snow.

FIG. 3 illustrates, in conjunction with an endless snowmobile belt track 28 utilization of snow plow bars 60. These snow plow bars are illustrated as being secured to the interior surface 42 of the endless belt track 28 using the previously mentioned rivets 56. Each bar 60 comprises a base 52 having apertures similar to the previously described apertures 54 which receive the fasteners 56 as well as a single protrusion or projection 62. Also, each successive bar 60 is shown as being oppositely diagonally oriented and immovably secured contiguously to said inside surface 42.

It is to be appreciated that while metal fasteners are shown as uniting each bar with the interior surface of the endless belt track, such union could be obtained using a bonding agent or, alternatively, the belt could be initially fabricated of one-piece elastomeric construction to comprise the bars as an integral part of the belt track. The only limiting requirement in respect to the present invention is that the snow plow bars must be used in conjunction with the drive components, which normally comprise a drive roller or sprocket or idler rollers or sprockets, wherein interference between the two is avoided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A snowmobile comprising:
a prime mover;
an endless belt track having inside and outside surfaces and upper and lower legs and being connected at said inside surface by drive means to and rotated by the prime mover, the outside surface powering the snowmobile by engagement with the snow;
snow plow means secured to the inside surface of the belt track and projecting into the enclosure between said upper and lower legs, the snow plow means being carried during rotation by the belt track and extending angularly across the belt a distance less than the full width of the belt so as to both (a) avoid interference with the drive means and (b) engage, loosen and plow snow from within the enclosure between said upper and lower legs and the ends of the endless belt track.

2. A snowmobile according to claim 1 wherein said plow means comprise bar means projecting away from the inside surface of the belt into the enclosure, said bar means being diagonally oriented across but spanning a distance less than the edge-to-edge distance of the inside belt track surface.

3. A snowmobile according to claim 2 wherein the bar means comprise a plurality of bars disposed at spaced locations along said inside belt track surface.

4. A snowmobile according to claim 1 wherein the snow plow means are secured to the inside surface of the belt track by fastener means.

5. A snowmobile comprising:
a prime mover;
an endless belt track having upper and lower legs and being connected by drive means to and rotated by the prime mover, said belt track having inside and outside surfaces, the outside surface powering the snowmobile by engagement with the snow;
snow plow means secured to the inside surface of the belt track and carried during rotation by the belt track so as to avoid interference with the drive means and to engage, loosen and plow snow from within the enclosure between said upper and lower legs and the ends of the endless belt track, said plow means comprising bar means projecting away from the inside surface of the belt into the enclosure, said bar means being diagonally oriented across but spanning a distance less than the edge-to-edge distance of the inside belt track surface, the bar means comprising at least two sets of bars, each set being oppositely diagonally disposed so as to respectively plow snow from within the belt enclosure toward opposite side edges of the belt track.

6. A snowmobile comprising:
a prime mover;
an endless belt track having upper and lower legs and being connected by drive means to and rotated by the prime mover, said belt track having inside and outside surfaces, the outside surface powering the snowmobile by engagement with the snow;
snow plow means secured to the inside surface of the belt track and carried during rotation by the belt track so as to avoid interference with the drive means and to engage, loosen and plow snow from within the enclosure between said upper and lower legs and the ends of the endless belt track, said plow means comprise bar means projecting away from the inside surface of the belt into the enclosure, said bar means being diagonally oriented across but spanning a distance less than the edge-to-edge distance of the inside belt track surface, said bar means comprise at least two spaced protrusions running parallel to each other.

* * * * *

Notice of Adverse Decision in Interference

In Interference No. 99,398, involving Patent No. 3,924,905, V. M. Simmons, REMOVAL OF OBSTRUCTING SNOW FROM WITHIN SNOWMOBILE TRACK ENCLOSURES, final judgment adverse to the patentee was rendered July 11, 1977, as to claims 1–6.

[*Official Gazette October 25, 1977.*]